US 11,409,106 B2

(12) United States Patent
Jung et al.

(10) Patent No.: US 11,409,106 B2
(45) Date of Patent: Aug. 9, 2022

(54) DISPLAY MODULE AND HEAD-MOUNTED DISPLAY DEVICE INCLUDING THE SAME

(71) Applicant: LG DISPLAY CO., LTD., Seoul (KR)

(72) Inventors: SungMin Jung, Seoul (KR); HanSeok Kim, Paju-si (KR); Keongjin Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 22 days.

(21) Appl. No.: 15/849,004

(22) Filed: Dec. 20, 2017

(65) Prior Publication Data

US 2018/0180888 A1    Jun. 28, 2018

(30) Foreign Application Priority Data

Dec. 28, 2016  (KR) ......................... 10-2016-0180923

(51) Int. Cl.
*G02B 27/01* (2006.01)
*G02F 1/1335* (2006.01)
*G02B 3/00* (2006.01)

(52) U.S. Cl.
CPC ....... *G02B 27/0172* (2013.01); *G02B 3/0056* (2013.01); *G02F 1/133512* (2013.01); *G02F 1/133526* (2013.01); *G02F 1/133528* (2013.01); *G02B 2003/0093* (2013.01)

(58) Field of Classification Search
CPC .............. G02B 27/0172; G02B 3/0056; G02B 2003/0093; G02F 1/133512; G02F 1/133526; G06F 3/011–013
See application file for complete search history.

(56) References Cited

U.S. PATENT DOCUMENTS

| 6,069,350 | A | * | 5/2000 | Ohtsuka | ............ | H01L 27/14627 |
| | | | | | | 250/208.1 |
| 2006/0001796 | A1 | | 1/2006 | Chang et al. | | |
| 2007/0046863 | A1 | | 3/2007 | Miyao et al. | | |
| 2008/0102387 | A1 | * | 5/2008 | Yukiko | ................ | G02B 3/0012 |
| | | | | | | 430/20 |
| 2009/0015751 | A1 | * | 1/2009 | Kim | .................. | G02F 1/133526 |
| | | | | | | 349/63 |
| 2009/0066880 | A1 | * | 3/2009 | Sugita | .................. | G02B 6/0038 |
| | | | | | | 349/64 |
| 2014/0027725 | A1 | | 1/2014 | Lim et al. | | |

(Continued)

FOREIGN PATENT DOCUMENTS

| CN | 1924618 A | 3/2007 |
| CN | 105929591 A | 9/2016 |

(Continued)

*Primary Examiner* — Hang Lin
(74) *Attorney, Agent, or Firm* — Birch, Stewart, Kolasch & Birch, LLP

(57) ABSTRACT

A display module and an HMD device including the same are discussed in which a black matrix is not recognized as a lattice type by a user without an increase in resolution of the display module. The display module according to an embodiment includes a first substrate on which a plurality of pixels are provided, a second substrate including one surface on which an engraved pattern is provided, and a lens layer filled into the engraved pattern of the second substrate. The lens layer comprises a plurality of lenses respectively corresponding to the plurality of pixels.

15 Claims, 9 Drawing Sheets

(56) References Cited

U.S. PATENT DOCUMENTS

| | | | | |
|---|---|---|---|---|
| 2014/0339509 A1* | 11/2014 | Choi | ................... | H01L 51/5275 |
| | | | | 257/40 |
| 2015/0144918 A1* | 5/2015 | Cho | ................ | B29D 11/00788 |
| | | | | 257/40 |
| 2015/0234189 A1* | 8/2015 | Lyons | ................ | G02B 27/0172 |
| | | | | 345/174 |
| 2018/0233686 A1 | 8/2018 | Tian et al. | | |

FOREIGN PATENT DOCUMENTS

| | | | |
|---|---|---|---|
| CN | 106104361 A | 11/2016 |
| JP | 2009-176699 A | 8/2009 |
| KR | 10-2012-0059953 A | 6/2012 |

* cited by examiner

DISPLAY MODULE AND HEAD-MOUNTED DISPLAY DEVICE INCLUDING THE SAME

CROSS-REFERENCE TO RELATED APPLICATIONS

This application claims the priority benefit of the Korean Patent Application No. 10-2016-0180923 filed on Dec. 28, 2016, which is hereby incorporated by reference as if fully set forth herein into the present application.

BACKGROUND

Field of the Invention

The present disclosure relates to a display module and a head-mounted display (HMD) device including the same.

Discussion of the Related Art

HMD devices are image display devices which are worn on a user in a glasses type or a helmet type and form a focal point at a distance close to eyes of the user. The HMD devices realize virtual reality (VR) or augmented reality (AR).

The HMD devices may each include an eyepiece lens where eyes of a user are located and a display module which displays an image. In the HMD devices, the eyepiece lens is disposed between the eyes of the user, and the display module displaying an image is disposed within a focal distance of the eyepiece lens. Therefore, when the display module displays an image, the user can look at a virtual image enlarged by the eyepiece lens.

The display module of the HMD devices may be implemented with a flat panel display device such as a liquid crystal display (LCD) device, an organic light emitting display device, or the like. The flat panel display device includes a plurality of pixels which display an image and a black matrix which defines each of the plurality of pixels.

In the HMD devices, the display module is shown to a user in an enlargement-like state, and for this reason, the black matrix of the display module can also be shown in an enlargement-like state. In this case, as in FIG. 1, the black matrix can be recognized as a lattice type by the user. In a case where a resolution of the display module increases, an area of the black matrix is reduced, and thus, a problem where the black matrix is recognized as the lattice type by the user may be addressed. However, since small display modules having a high resolution are applied, the manufacturing cost of the HMD devices can increase.

SUMMARY

Accordingly, the present disclosure is directed to provide a display module and a head-mounted display (HMD) device including the same that substantially obviate one or more problems due to limitations and disadvantages of the related art.

An aspect of the present disclosure is directed to provide a display module and an HMD device including the same, in which a black matrix is not recognized as a lattice type by a user without an increase in resolution of the display module.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display module including a first substrate on which a plurality of pixels are provided, a second substrate including one surface on which an engraved pattern is provided, and a lens layer filled into the engraved pattern of the second substrate. The lens layer comprises a plurality of lenses respectively corresponding to the plurality of pixels.

In another aspect of the present disclosure, there is provided a head-mounted display device including an eyepiece lens and a display module providing an image to the eyepiece lens. The display module includes a first substrate on which a plurality of pixels are provided, a second substrate including one surface on which an engraved pattern is provided, and a lens layer filled into the engraved pattern of the second substrate. The lens layer comprises a plurality of lenses respectively corresponding to the plurality of pixels.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
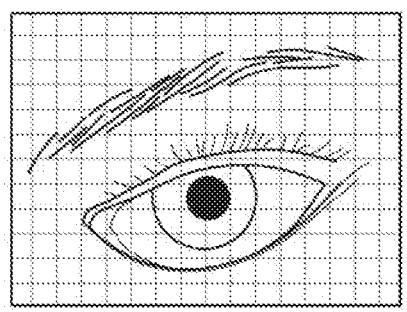
FIG. 1 is an exemplary diagram illustrating a lattice pattern of an image displayed by a related art HMD device.

Reference will now be made in detail to the exemplary embodiments of the present disclosure, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of the present disclosure will be described in detail with reference to the accompanying drawings.

Figure 2A:
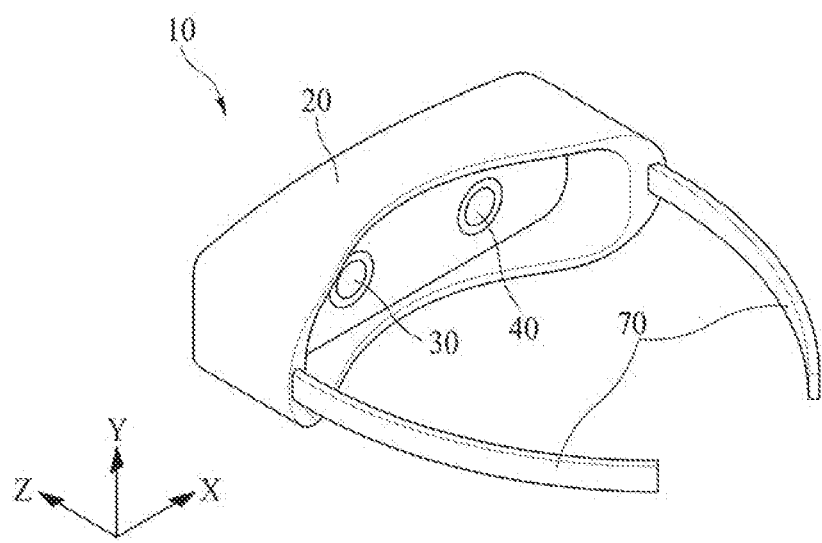
FIGS. 2A and 2B are perspective views illustrating an HMD device according to an embodiment of the present disclosure.
Figure 2B:
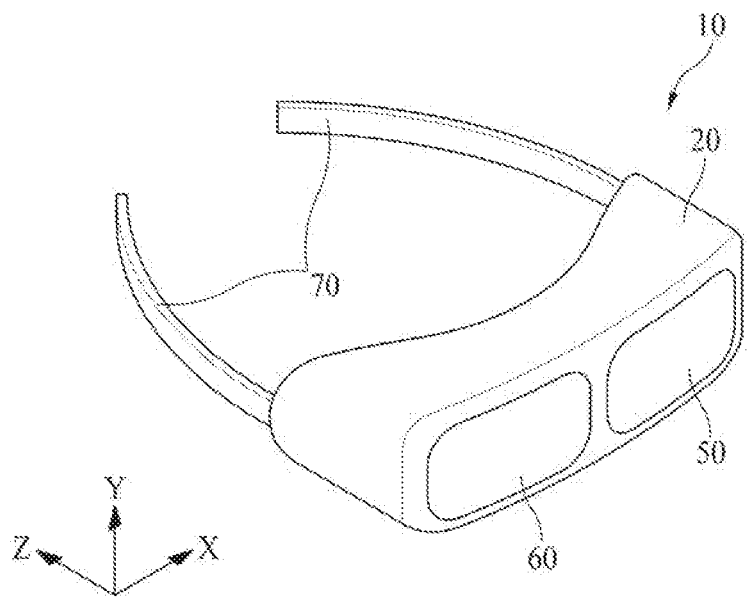

FIGS. 2A and 2B are perspective views illustrating an HMD device 10 according to an embodiment of the present disclosure. FIG. 2A is illustrated in order for a rear surface of a display accommodating unit 20 of the HMD device 10, and FIG. 2B is illustrated in order for the front of the display accommodating unit 20 of the HMD device 10. All the components of the HMD device according to all embodiments of the present disclosure are operatively coupled and configured.

Referring to FIGS. 2A and 2B, the HMD device 10 according to an embodiment of the present disclosure may include the display module accommodating unit 20, a first eyepiece lens 30, a second eyepiece lens 40, a first glass 50, a second glass 60, and glasses temples 70.

The HMD device 10 according to an embodiment of the present disclosure is illustrated as being implemented as a glasses type including the glasses temples 70 in order for a user to easily wear or take off glasses as illustrated in FIGS. 2A and 2B, but is not limited thereto. That is, the HMD device 10 may include a head-mounted band capable of being worn on a head, instead of the glasses temples 70.

The display module accommodating unit 20 may include a display module, which displays an image, and an optical means for providing the image, displayed on the display module, to the first and second eyepieces lenses 30 and 40. Examples of the display module accommodating unit 20 will be described later in detail with reference to FIGS. 3 and 4.

The first and second eyepiece lenses 30 and 40 may be disposed on a rear surface of the display module accommodating unit 20. The first eyepiece lens 30 may be a left-eye lens where a left eye of a user is located, and the second eyepiece lens 40 may be a right-eye lens where a right eye of the user is located. Therefore, the user may watch an image displayed on the display module of the display module accommodating unit 20 through the first and second eyepiece lenses 30 and 40. Each of the first and second eyepiece lenses 30 and 40 may be implemented as a convex lens or a Fresnel lens, but is not limited thereto.

The first glass 50 and the second glass 60 may be disposed in front of the display module accommodating unit 20. The first glass 50 may be disposed in correspondence with the first eyepiece lens 30, and the second glass 60 may be disposed in correspondence with the second eyepiece lens 40. Therefore, the user may look at a foreground, seen through the first glass 50 and the second glass 60 by using the first and second eyepieces lenses 30 and 40, in front of the display module accommodating unit 20. The first glass 50 and the second glass 60 may be designed to be closed or opened based on the requirements of users. Alternatively, the first glass 50 and the second glass 60 may be omitted.

Figure 3:
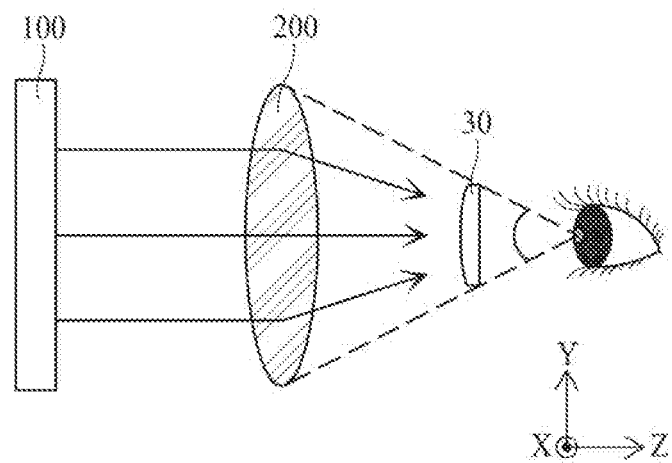
FIG. 3 is an exemplary diagram illustrating an example of a display module accommodating unit of FIGS. 2A and 2B.

FIG. 3 is an exemplary diagram illustrating an example of a display module accommodating unit of FIGS. 2A and 2B.

FIG. 3 corresponds to one side view when the display module accommodating unit is seen from one side surface thereof. In FIG. 3, elements of the display module accommodating unit 20 disposed in correspondence with the first eyepiece lens 30 are illustrated. Elements of the display module accommodating unit 20 disposed in correspondence with the second eyepiece lens 40 are substantially the same as the illustration of FIG. 3, and thus, are omitted.

Referring to FIG. 3 the display module accommodating unit 20 may include a display module 100 and a condensing lens 200.

The display module 100 may be a display device which displays an image. For example, the display module 100 may be implemented as a small display device such as an LCD device, an organic light emitting device on silicon substrate (OLEDoS), a liquid crystal on silicon substrate (LCoS), or a light emitting diode on silicon substrate (LEDoS). Hereinafter, for convenience of description, an example where the display module 100 is an organic light emitting display device is illustrated, but an embodiment of the present disclosure is not limited thereto and can include other types. The display module 100 will be described later in detail with reference to FIGS. 5 and 6.

The condensing lens 200 may be disposed between the display module 100 and the first eyepiece lens 30. The condensing lens 200 may provide an image, displayed on the display module 100, to the first eyepiece lens 30. The first eyepiece lens 30 may be implemented as a convex lens or a Fresnel lens, but is not limited thereto. Depending on the case, the condensing lens 200 may be omitted.

The first glass 50 and the second glass 60 may be designed so as to be opened or closed depending on the requirement of users. Alternatively, the first glass 50 and the second glass 60 may be omitted.

That is, in an embodiment of the present disclosure, a virtual image displayed by the display module of the display module accommodating unit 20 may be provided to eyes of a user through the first eyepiece lens 30. As a result, in an embodiment of the present disclosure, virtual reality (VR) is realized.

Figure 4:
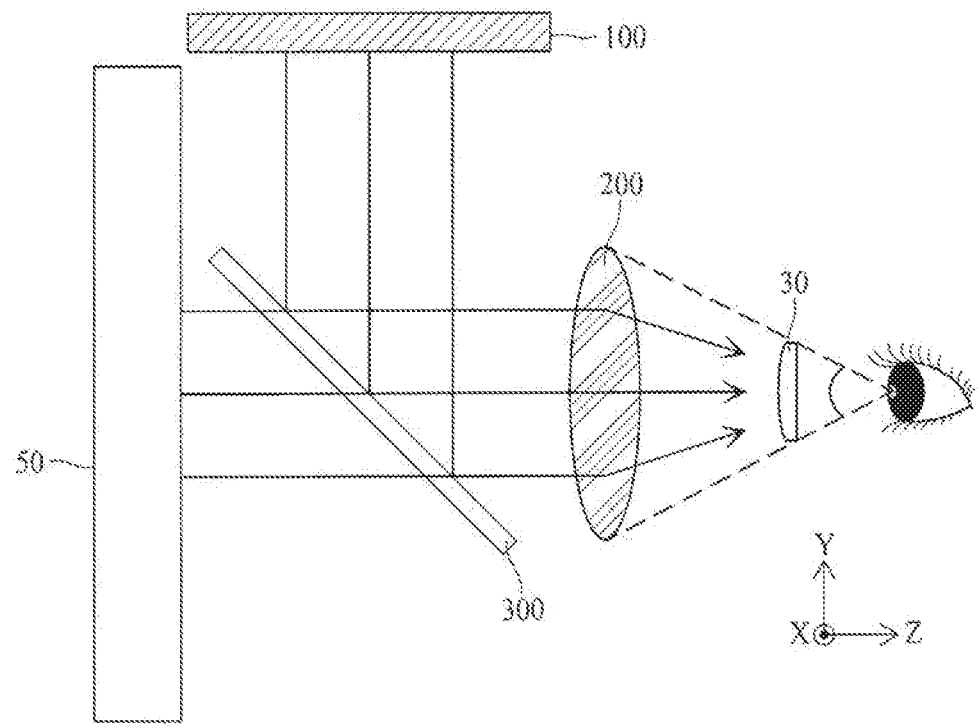
FIG. 4 is an exemplary diagram illustrating another example of a display module accommodating unit of FIGS. 2A and 2B.

FIG. 4 is an exemplary diagram illustrating another example of the display module accommodating unit of FIGS. 2A and 2B.

FIG. 4 corresponds to one side view when the display module accommodating unit is seen from one side surface thereof. In FIG. 4, elements of the display module accommodating unit 20 disposed in correspondence with the first eyepiece lens 30 are illustrated. Elements of the display module accommodating unit 20 disposed in correspondence with the second eyepiece lens 40 are substantially the same as the illustration of FIG. 4, and thus, are omitted.

Referring to FIG. 4, the display module accommodating unit 20 may include the display module 100, the condensing lens 200, and a transmissive reflector 300.

The display module 100 may be disposed on the transmissive reflector 300. The display module 100 may be a display device which displays an image. For example, the display module 100 may be implemented as a small display device such as an LCD device, an organic light emitting device on silicon substrate (OLEDoS), a liquid crystal on silicon substrate (LCoS), or a light emitting diode on silicon substrate (LEDoS). Hereinafter, for convenience of description, an example where the display module 100 is an organic light emitting display device is illustrated, but an embodiment of the present disclosure is not limited thereto. The display module 100 will be described later in detail with reference to FIGS. 5 and 6.

The condensing lens 200 may be disposed between the transmissive reflector 300 and the first eyepiece lens 30. The condensing lens 200 may provide an image, displayed on the display module 100 and reflected by the transmissive reflector 300, to the first eyepiece lens 30. The condensing lens 200 may be implemented as a convex lens or a Fresnel lens, but is not limited thereto. Depending on the case, the condensing lens 200 may be omitted.

The transmissive reflector 300 may be disposed between the condensing lens 200 and the first glass 50. The transmissive reflector 300 may be a reflective polarizer or a half mirror which transmits some of light and reflects the other light. The half mirror may include glass and a semi-transmissive conductive layer provided on one surface of the glass. The semi-transmissive conductive layer may be formed of a semi-transmissive conductive material such as Mg, Ag, or an alloy of Mg and Ag. The reflective polarizer may be an advanced polarizing film (APF) or a dual bright enhanced film (DBEF), but is not limited thereto.

The first glass 50 and the second glass 60 may be designed so as to be opened or closed depending on the requirement of users. Alternatively, the first glass 50 and the second glass 60 may be omitted.

As described above, in an embodiment of the present disclosure, since the transmissive reflector 300 which transmits some of light and reflects the other light is provided, the transmissive reflector 300 may transmit light incident from the first glass 50 and may provide an image, displayed on the display module 100, to the condensing lens 200. Therefore, a user can watch all of a scene, seen through the first glass 50 by using the first eyepiece lens 30, and the image displayed on the display module 100. That is, the user can watch one image obtained by overlapping a scene of reality and a virtual image, and thus, AR is realized.

Moreover, in an embodiment of the present disclosure, in a case where the first glass 50 is closed or omitted, the transmissive reflector 300 may provide an image, displayed on the display module 100, to the condensing lens 200. Therefore, in an embodiment of the present disclosure, the first eyepiece lens 30 may provide an image, displayed on the display module 100, to eyes of a user. Accordingly, in an embodiment of the present disclosure, VR is realized.

Figure 5:
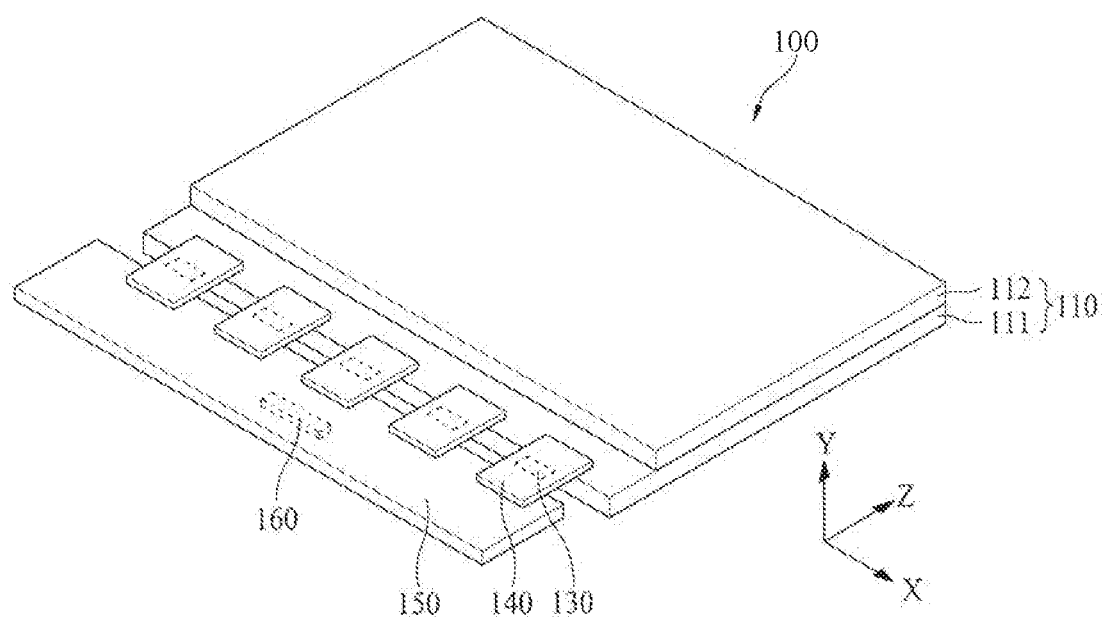
FIG. 5 is a perspective view illustrating a display module of FIG. 3 or FIG. 4.
Figure 6:
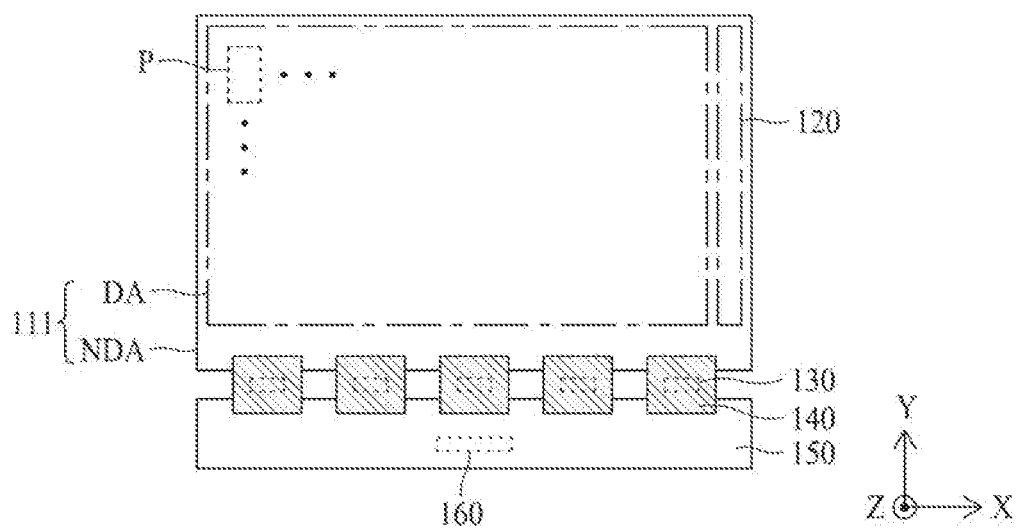
FIG. 6 is a plan view illustrating a first substrate, a gate driver, a source drive integrated circuit (IC), a flexible film, a circuit board, and a timing controller of FIG. 3 or 4.

FIG. 5 is a perspective view illustrating an example of a display module of FIG. 3 or FIG. 4. FIG. 6 is a plan view illustrating a first substrate, a gate driver, a source drive IC, a flexible film, a circuit board, and a timing controller of FIG. 3 or 4.

In FIG. 6, for convenience of description, a second substrate 112 is omitted, and the second substrate 112 may be disposed to cover a display area DA of a first substrate 111.

Referring to FIGS. 5 and 6, the display module 100 according to an embodiment of the present disclosure may include a display panel 110, a gate driver 120, a source drive IC 130, a flexible film 140, a circuit board 150, and a timing controller 160.

The display panel 110 may include the first substrate 111 and the second substrate 112. An example where the first substrate 111 and the second substrate 112 are each formed of glass is described, but the first substrate 111 and the second substrate 112 are each formed of plastic without being limited thereto.

A plurality of gate lines, a plurality of data lines, and a plurality of pixels may be provided on the first substrate 111.

The pixels may be respectively provided in a plurality of areas defined by an intersection structure of the gate lines and the date lines.

Each of the pixels may include a thin film transistor (TFT) and an organic light emitting device which includes a first electrode, an organic light emitting layer, and a second electrode. When a gate signal is input through a gate line, each of the pixels may supply a certain current to the organic light emitting device by using the TFT according to a data voltage supplied through a data line. Therefore, the organic light emitting device of each of the pixels may emit light having certain brightness according to the certain current. The pixels will be described below in detail with reference to FIG. 4, but may be applicable to other examples such as FIG. 3.

The display panel 110 may be divided into the display area DA, where the pixels are provided to display an image, and a non-display area NDA which does not display an image. The gate lines, the data lines, and the pixels may be provided in the display area DA. The gate driver 120 and a plurality of pads may be provided in the non-display area NDA.

The gate driver 120 may sequentially supply gate signals to the gate lines according to a gate control signal input from the timing controller 160. The gate driver 120 may be provided in the non-display area NDA outside one side or both sides of the display area DA of the display panel 110 in a gate driver-in panel (GIP) type. Alternatively, the gate driver 120 may be manufactured as a driving chip and may be mounted on a flexible film, and moreover, may be attached on the non-display area NDA outside the one side or the both sides of the display area DA of the display panel 110 in a tape automated bonding (TAB) type.

The source drive IC 130 may receive digital video data and a source control signal from the timing controller 160. The source driver IC 130 may convert the digital video data into analog data voltages according to the source control signal and may respectively supply the analog data voltages to the data lines. If the source drive IC 130 is manufactured as a driving chip, the source drive IC 130 may be mounted on the flexible film 140 in a chip-on film (COF) type or a chip-on plastic (COP) type.

A plurality of pads such as data pads may be provided in the non-display area NDA of the display panel 110. Lines connecting the pads to the source drive IC 130 and lines connecting the pads to lines of the circuit board 150 may be provided on the flexible film 140. The flexible film 140 may be attached on the pads by using an anisotropic conductive film, and thus, the pads may be connected to the lines of the flexible film 140.

The circuit board 150 may be attached on the flexible film 140 which is provided in plurality. A plurality of circuits implemented as driving chips may be mounted on the circuit board 150. For example, the timing controller 160 may be mounted on the circuit board 150. The circuit board 150 may be a printed circuit board (PCB) or a flexible printed circuit board (FPCB).

The timing controller 160 may receive the digital video data and a timing signal from an external system board through a cable of the circuit board 150. The timing controller 160 may generate a gate control signal for controlling an operation timing of the gate driver 120 and a source control signal for controlling the source drive IC 130 which is provided in plurality, based on the timing signal. The timing controller 160 may supply the gate control signal to the gate driver 120 and may supply the source control signal to the plurality of source drive ICs 130.

Figure 7:
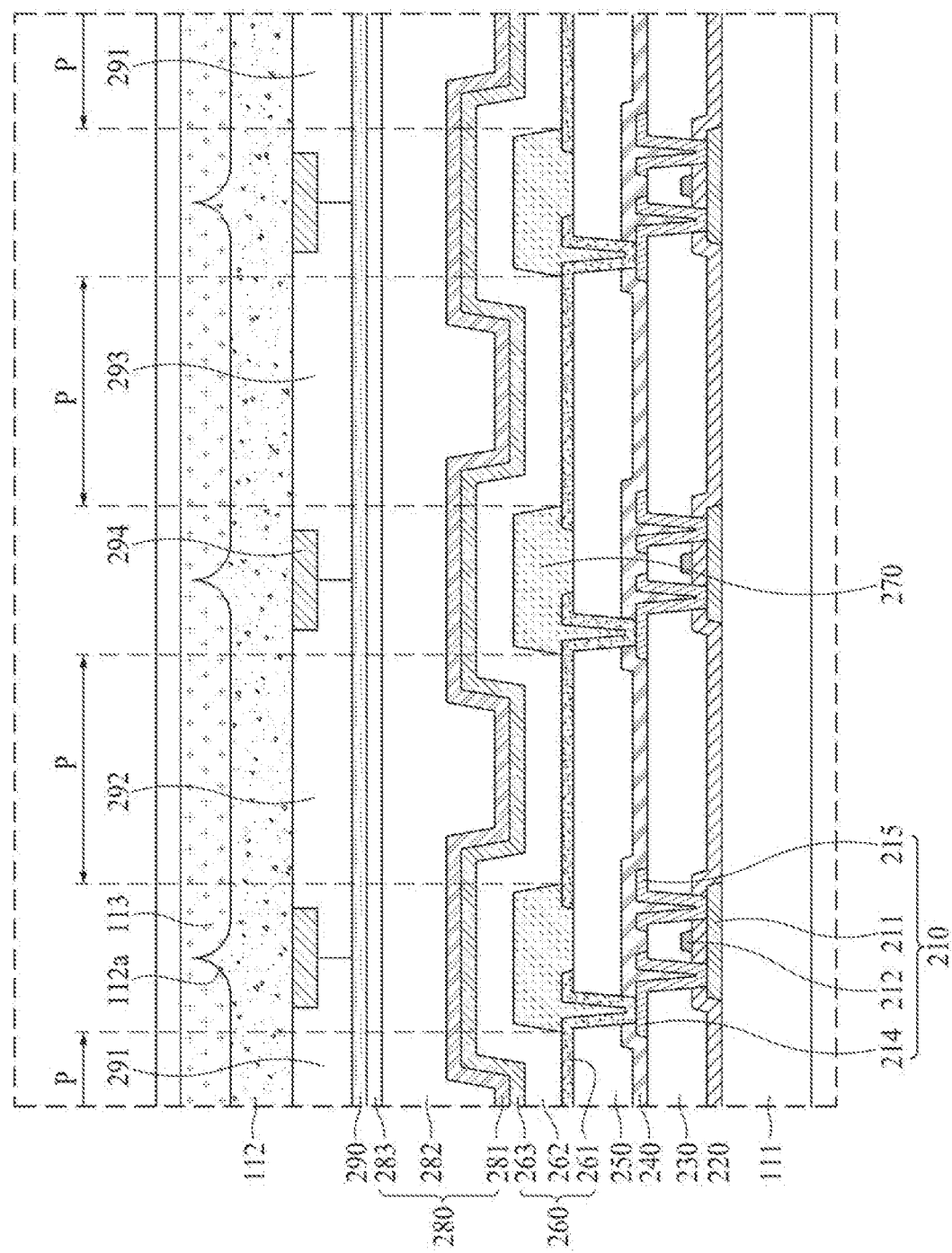
FIG. 7 is a cross-sectional view illustrating pixels of a display panel according to an embodiment of the present disclosure.

FIG. 7 is a cross-sectional view illustrating pixels of a display panel according to an embodiment of the present invention. For example, the display panel 110 can be the display panel of FIG. 7.

Referring to FIG. 7, a plurality of TFTs 210 may be formed on a first substrate 111. Before forming the TFTs 210, a buffer layer may be formed on the first substrate 111. The buffer layer may be formed on the first substrate 111, for protecting the TFTs 210 and organic light emitting devices 260 from water which penetrates through the first substrate 111 vulnerable to penetration of water. The buffer layer may include a plurality of inorganic layers which are alternately stacked. For example, the buffer layer may be formed of a multilayer where one or more inorganic layers of silicon oxide (SiOx), silicon nitride (SiNx), and SiON are alternately stacked. The buffer layer may be omitted.

The TFTs 210 may be formed on the buffer layer. Each of the TFTs 210 may include an active layer 211, a gate electrode 212, a source electrode 213, and a drain electrode 214. In FIG. 7, the TFTs 210 are exemplarily illustrated as being formed as a top gate type where the gate electrode 212 is disposed on the active layer 211, but is not limited thereto. In other embodiments, the TFTs 210 may be formed as a bottom gate type where the gate electrode 212 is disposed under the active layer 211 or a double gate type where the gate electrode 212 is disposed both on and under the active layer 211.

The active layer 211 may be formed on the buffer layer. The active layer 211 may be formed of a silicon-based semiconductor material or an oxide-based semiconductor material. A light blocking layer for blocking external light incident on the active layer 211 may be formed between the buffer layer and the active layer 211.

A gate insulation layer 220 may be formed on the active layer 211. The gate insulation layer 220 may be formed of an inorganic layer, for example, silicon oxide (SiOx), silicon nitride (SiNx), or a multilayer thereof.

The gate electrode 212 and a gate line may be formed on the gate insulation layer 220. The gate electrode 212 and the gate line may each be formed of a single layer or a multilayer which includes one of molybdenum (Mo), aluminum (Al), chromium (Cr), gold (Au), titanium (Ti), nickel (Ni), neodymium (Nd), and copper (Cu), or an alloy thereof.

An interlayer dielectric 230 may be formed on the gate electrode 212 and the gate line. The interlayer dielectric 230 may be formed of an inorganic layer, for example, SiOx, SiNx, or a multilayer thereof.

The source electrode 213, the drain electrode 214, and a data line may be formed on the interlayer dielectric 230. The source electrode 213 may contact the active layer 211 through a contact hole which passes through the gate insulation layer 220 and the interlayer dielectric 230. The drain electrode 214 may contact the active layer 211 through a contact hole which passes through the gate insulation layer 220 and the interlayer dielectric 230. The source electrode 213, the drain electrode 214, and the data line may each be formed of a single layer or a multilayer which includes one of Mo, Al, Cr, Au, Ti, Ni, Nd, and Cu, or an alloy thereof.

A passivation layer 240 for insulating the TFTs 210 may be formed on the source electrode 213, the drain electrode 214, and the data line. The passivation layer 240 may be formed of an inorganic layer, for example, SiOx, SiNx, or a multilayer thereof.

A planarization layer 250 for planarizing a step height caused by the TFTs 210 may be formed on the passivation layer 240. The passivation layer 250 may be formed of an organic layer such as acryl resin, epoxy resin, phenolic resin, polyamide resin, polyimide resin, and/or the like.

An organic light emitting device 260 and a bank 270 may be formed on the first planarization layer 250. The organic light emitting device 260 may include a first electrode 261, an organic light emitting layer 262, and a second electrode 263. The first electrode 261 may be an anode electrode, and the second electrode 263 may be a cathode electrode.

The first electrode 261 may be formed on the planarization layer 250. The first electrode 261 may be connected to the source electrode 213 of the TFT 210 through a shared contact hole which passes through the passivation layer 240 and the planarization layer 250. In a top emission type where light emitted from each of the pixels P is output in a direction toward the second substrate 112, the first electrode 261 may be formed of a metal material, having a high reflectivity, such as a stacked structure (Ti/Al/Ti) of aluminum (Al) and titanium (Ti), a stacked structure (ITO/Al/ITO) of Al and ITO, an APC alloy, a stacked structure (ITO/APC/ITO) of an APC alloy and ITO, and/or the like. The APC alloy may be an alloy of Ag, palladium (Pd), and Cu.

The bank 270 may be formed on the planarization layer 250 to cover an edge of the first electrode 261, for dividing the pixels P. That is, the bank 270 may act as a pixel defining layer that defines the pixels P.

Each of the pixels P may denote an area where the first electrode 261 corresponding to an anode electrode, the organic light emitting layer 262, and the second electrode 263 corresponding to a cathode electrode are sequentially stacked, and a hole from the first electrode 261 and an electron from the second electrode 263 are combined in the organic light emitting layer 262 to emit light. In this case, an area where the bank 270 is provided does not emit light, and thus, may be defined as a non-emissive area.

The bank 270 may be formed of an organic layer such as acryl resin, epoxy resin, phenolic resin, polyamide resin, polyimide resin, and/or the like.

The organic light emitting layer 262 may be formed on the first electrode 261 and the bank 270. The organic light emitting layer 262 may be a common layer which is provided in the pixels P in common, and may be a white light emitting layer that emits white light. In this case, the organic light emitting layer 262 may be deposited by using an open mask where an opening area is provided in a whole display area.

In a case where the organic light emitting layer 262 is provided as a common layer which emits white light, 262 may be a white light emitting layer emitting white light. In this case, the organic light emitting layer 262 may be provided in a tandem structure of two or more stacks. The two or more stacks may each include a hole transporting layer, at least one light emitting layer, and an electron transporting layer. That is, the organic light emitting layer 262 may include the hole transporting layer, the at least one light emitting layer, and the electron transporting layer.

Moreover, a charge generating layer may be formed between adjacent stacks. The charge generating layer may include an n-type charge generating layer, disposed adjacent to a lower stack, and a p-type charge generating layer which is formed on the n-type charge generating layer and is disposed adjacent to an upper stack. The n-type charge generating layer may inject an electron into the lower stack, and the p-type charge generating layer may inject a hole into the upper stack. The n-type charge generating layer may be formed of an organic layer which is doped with alkali metal, such as lithium (Li), sodium (Na), potassium (K), or cesium (Cs), or alkali earth metal such as magnesium (Mg), strontium (Sr), barium (Ba), or radium (Ra). The p-type charge generating layer may be an organic layer which is formed by doping a dopant on an organic host material having an ability to transport holes.

In FIG. 7, it is illustrated that the organic light emitting layer 262 is the common layer which is formed in the pixels P in common and is the white light emitting layer emitting the white light, but the present embodiment is not limited thereto. In other embodiments, the organic light emitting layer 262 may be individually provided in each of the pixels P, and in this case, each of the pixels P may include a first light emitting layer emitting light of a first color, a second light emitting layer emitting light of a second color, or a third light emitting layer emitting light of a third color. For example, the first light emitting layer may be a red light emitting layer emitting red light, the second light emitting layer may be a green light emitting layer emitting green light, and the third light emitting layer may be a blue light emitting layer emitting blue light. In this case, each of the first to third light emitting layers may be deposited by using a fine metal mask (FMM).

The second electrode 263 may be formed on the organic light emitting layer 262. The second electrode 263 may be a common layer which is formed in the pixels P in common. The second electrode 263 may be formed of a transparent conductive material (or TCO), such as indium tin oxide (ITO) or indium zinc oxide (IZO) capable of transmitting light, or a semi-transmissive conductive material such as Mg, Ag, or an alloy of Mg and Ag. In a case where the second electrode 140 is formed of the semi-transmissive conductive material, emission efficiency is enhanced by a micro-cavity. A capping layer may be formed on the second electrode 263.

An encapsulation layer 280 may be formed on the second electrode 263. The encapsulation layer 280 prevents oxygen or water from penetrating into the organic light emitting layer 262 and the second electrode 263. The encapsulation layer 280 may include at least one inorganic layer. Also, the encapsulation layer 280 may further include at least one organic layer, for preventing particles from penetrating into the organic light emitting layer 262 and the second electrode 263 via the encapsulation layer 280 and a first inorganic layer 281. For example, as illustrated in FIG. 7, the encapsulation layer 280 may include the first inorganic layer 281, an organic layer 282, and a second inorganic layer 283.

The first inorganic layer 281 may be disposed on the second electrode 263. The first inorganic layer 281 may be provided to cover the second electrode 263.

The organic layer 282 may be disposed on the first inorganic layer 281. The organic layer 282 may be provided to have a sufficient thickness for preventing particles from penetrating into the organic light emitting layer 262 and the second electrode 263 via the encapsulation layer 280 and the first inorganic layer 281.

The second inorganic layer 283 may be disposed on the organic layer 282. The second inorganic layer 283 may be provided to cover the organic layer 282.

Each of the first and second inorganic layers 281 and 283 may be formed of silicon nitride, aluminum nitride, zirconium nitride, titanium nitride, hafnium nitride, tantalum nitride, silicon oxide, aluminum oxide, titanium oxide, and/or the like.

First to third color filters 291 to 293 and a black matrix 294 may be provided between the first substrate 111 and the second substrate 112. The first to third color filters 291 to 293 and the black matrix 294 may be provided on one surface of the second substrate 112 facing the first substrate 111. Each of the first to third color filters 291 to 293 may be disposed in correspondence with a pixel P, and the black matrix 294 may be disposed in correspondence with the bank 270. For example, the first color filter 291 may be a red color filter, the second color filter 292 may be a green color filter, and the third color filter 293 may be a blue color filter.

An engraved pattern 112a may be provided on the other surface opposite to the one surface of the second substrate 112. A lens layer 113 may be provided on the other surface of the second substrate 112. The lens layer 113 may be provided to cover the engraved pattern 112a, and the lens layer 113 may be filled into the engraved pattern 112a.

The lens layer 113 may be formed of resin having a refractive index which is higher than that of the second substrate 112. The resin may be ultraviolet (UV)-curable resin. In a case where the second substrate 112 is glass, the second substrate 112 may have a refractive index of 1.5, and thus, the resin may be a material having a refractive index of 1.6 or more. For example, the resin may be a material where an acrylate monomer, a high refractive dispersed inorganic particle, a UV photo initiator, and an additive are mixed. The acrylate monomer may be a urethane acrylate monomer, and the high refractive dispersed inorganic particle may be a zirconia powder ($ZrO_2$). However, the present embodiment is not limited thereto. Therefore, the lens layer 113 may act as a lens having a certain refractive index, based on a shape of the engraved pattern 112a. The lens layer 113 will be described later in detail with reference to FIG. 8.

A polarizer for preventing reflection of external light may be attached on the lens layer 113.

The encapsulation layer 280 of the first substrate 111 may be attached on the color filters 291 to 293 of the second substrate 112 by using an adhesive layer 290, and thus, the first substrate 111 may be bonded to the second substrate 112. The adhesive layer 290 may be transparent adhesive resin. The second substrate 112 may be a plastic film, a glass film, or an encapsulation film (a protective film).

Figure 8:
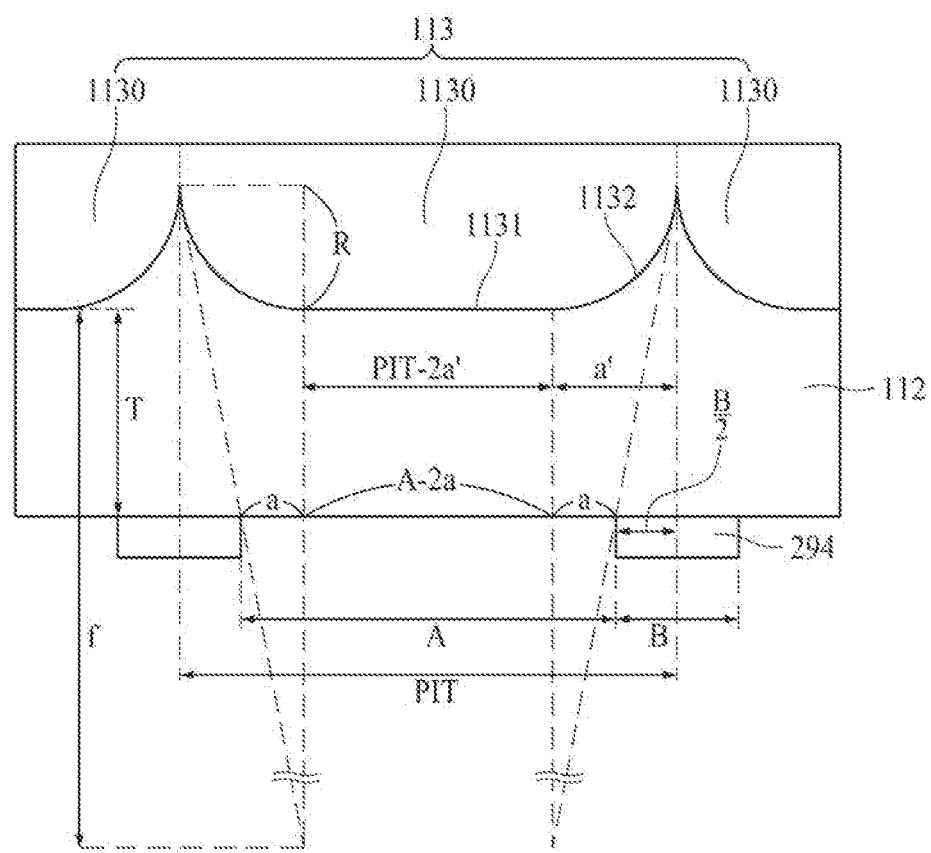
FIG. 8 is an enlarged view of an area A of FIG. 7.

FIG. 8 is an enlarged view of an area A of FIG. 7.

In FIG. 8, for convenience of description, only the black matrix 294, the second substrate 112, and the lens layer 113 are illustrated.

Referring to FIG. 8, the lens layer 113 may include a plurality of lenses 1130. Each of the plurality of lenses 1130 may be disposed in correspondence with an opening area. The opening area may be an area which is not covered by the black matrix 294. A pitch PIT of each of the plurality of lenses 1130 may be set to a width A of the opening area and a width B of the black matrix 294.

Each of the plurality of lenses 1130 may include a planar part 1131 disposed in a center thereof and a curvature part 1132 which extends from an edge of the planar part 1131 and has a certain curvature radius R. The curvature part 1132 may have a focal distance f, based on the curvature radius R, and thus, may act as a lens which refracts incident light.

The planar part 1131 may be disposed in the opening area, and the curvature part 1132 may be disposed in correspondence with the black matrix 294. That is, the curvature part 1132 is overlapped with the black matrix 294. In a case where a width of the curvature part 1132 is defined as a', a width of the planar part 1131 may be defined as "PIT-2a'". The width "PIT-2a'" of the planar part 1131 may be set wider than the width a' of the curvature part 1132 and may be set narrower than the width A of the opening area. The width "PIT-2a'" of the planar part 1131 may be set wider than half "B/2" of the width B of black matrix 294. In this case, the width a' of the curvature part 1132 may be set to a sum of the half "B/2" of the width B of black matrix 294 and a width a of an edge of the opening area overlapping the focal distance f. Therefore, it may be assumed that the width "PIT-2a'" of the planar part 1131 is substantially the same as "A-2a".

The curvature part 1132 may have the focal distance f, based on the curvature radius R. In this case, the curvature radius R of the curvature part 1132 may be calculated as expressed in the following Equation (1):

$$R = \frac{n2 - n1}{n1} \times f \tag{1}$$

where R denotes a curvature radius of the curvature part 1132, n1 denotes a refractive index of the second substrate 112, n2 denotes a refractive index of the lens 1130, and f denotes a focal distance of the curvature part 1132. That is, the curvature radius R of the curvature part 1132 may be set based on the refractive index n2 of the second substrate 112, the refractive index n1 of the lens 1130, and the focal distance f of the curvature part 1132. The focal distance f of the curvature part 1132 may be a distance from the lens 1130 to the organic light emitting layer 262 of the pixel P.

In a case where the refractive index n2 of the lens 1130 is less than that of the second substrate 112, the curvature radius R of the curvature part 1132 may have a value which is less than 0. Therefore, the refractive index n2 of the lens 1130 may be greater than that of the second substrate 112.

Moreover, the following Equation (2) may be calculated from the focal distance f of the curvature part 1132 and a thickness T of the second substrate 112:

$$a:a'=f-T:f \tag{2}$$

where a denotes a width of the edge of the opening area overlapping the focal distance f, a' denotes a width of the curvature part 1132, f denotes a focal distance of the curvature part 1132, and T denotes a thickness of the second substrate 112. The following Equation (3) may be calculated from Equation (2):

$$a' = a \times \frac{f}{f - T} \tag{3}$$

Moreover, as in Equation (4), the width a' of the curvature part 1132 may be set to the sum of the half "B/2" of the width B of black matrix 294 and the width a of the edge of the opening area overlapping the focal distance f:

$$a' = a + \frac{B}{2} \tag{4}$$

By using Equations (3) and (4), the width a of the edge of the opening area overlapping the focal distance f may be calculated as expressed in the following Equation (5):

$$a = \frac{B(f - T)}{2T} \tag{5}$$

When the width a, calculated as expressed in Equation (5), of the edge of the opening area overlapping the focal distance f is substituted into Equation (3) or (4), the width a' of the curvature part 1132 may be calculated as expressed in the following Equation (6):

$$a' = \frac{B \times f}{2T} \quad (6)$$

As in Equation (6), the width a' of the curvature part 1132 may be set based on the width B of the black matrix 294, the thickness T of the second substrate 112, and the focal distance f of the curvature part 1132.

Figure 9:
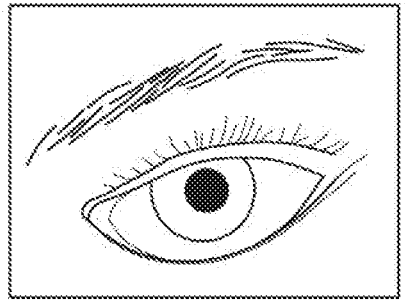
FIG. 9 is an exemplary diagram illustrating a lattice pattern of an image displayed by an HMD device according to an embodiment of the present disclosure.

As described above, in an embodiment of the present disclosure, the curvature radius R of the curvature part 1132 may be set based on the refractive index n2 of the second substrate 112, the refractive index n1 of the lens 1130, and the focal distance f of the curvature part 1132 as in Equation (1). Also, in an embodiment of the present disclosure, the width a' of the curvature part 1132 may be set based on the width B of the black matrix 294, the thickness T of the second substrate 112, and the focal distance f of the curvature part 1132 as in Equation (6). As a result, in an embodiment of the present disclosure, light L which is emitted from the pixel P and travels to the curvature part 1132 of the lens 1130 through the opening area may be refracted by the curvature radius R and may be output in an up direction. That is, in an embodiment of the present disclosure, the light L emitted from the pixel P may be expanded and output to an area where the black matrix 294 is provided. Accordingly, in an embodiment of the present disclosure, the black matrix 294 is not discerned by a user as in FIG. 9.

Figure 10:
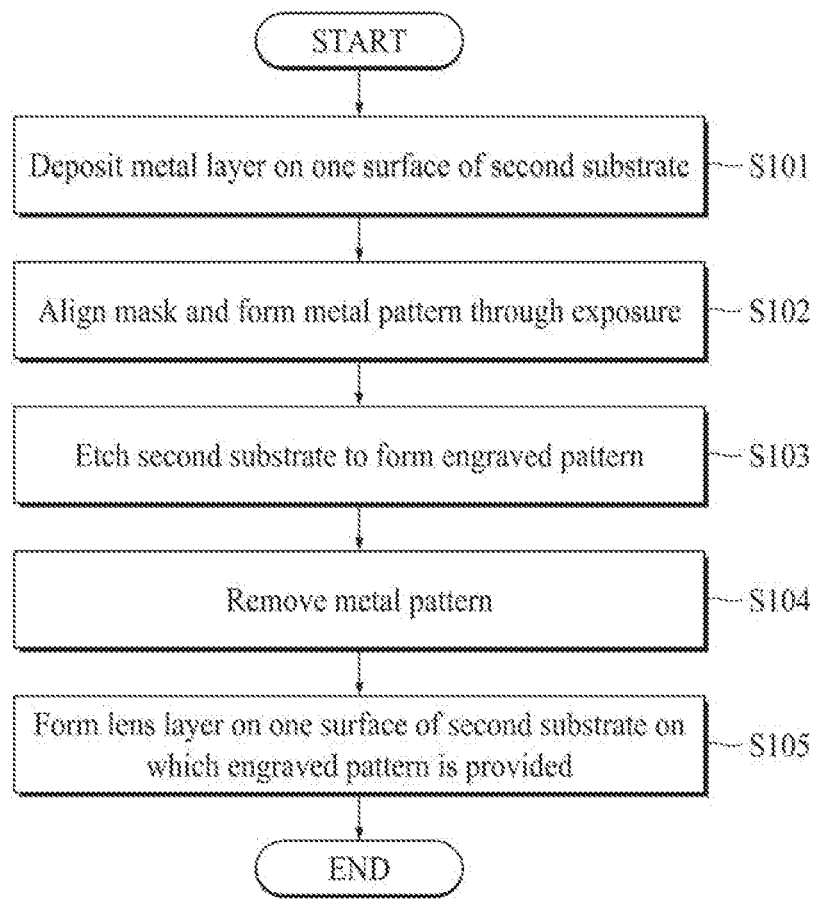
FIG. 10 is a flowchart illustrating a method of manufacturing a second substrate including a lens layer according to an embodiment of the present disclosure.

FIG. 10 is a flowchart illustrating a method of manufacturing a second substrate including a lens layer according to an embodiment of the present disclosure. FIGS. 11A to 11E are diagrams illustrating a method of manufacturing a second substrate including a lens layer according to an embodiment of the present disclosure.

Hereinafter, an example of a method of manufacturing a second substrate including a lens layer will be described in detail with reference to FIGS. 10 and 11A to 11E. In FIGS. 10 and 11A to 11E, an example where a second substrate 112 is a glass substrate is illustrated.

Figure 11A:
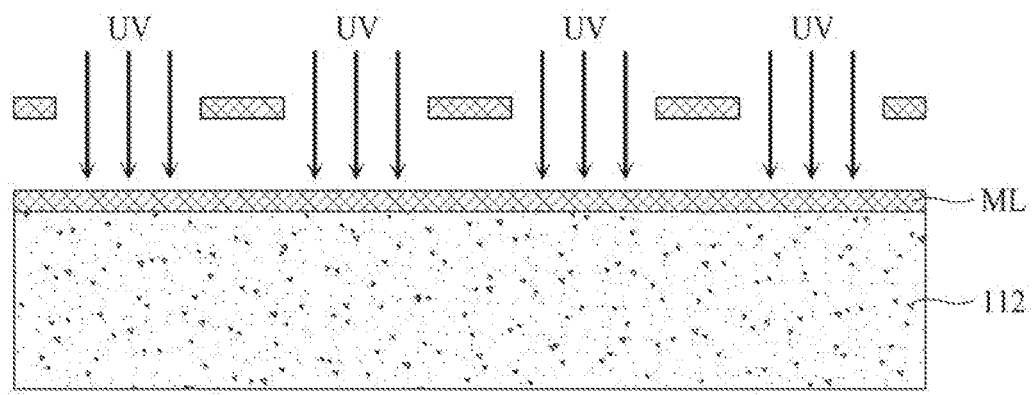
FIGS. 11A to 11E are diagrams illustrating a method of manufacturing a second substrate including a lens layer according to an embodiment of the present disclosure.

First, as in FIG. 11A, a metal layer ML may be deposited on one surface of the second substrate 112. The metal layer ML may be molybdenum (Mo) and may be deposited to have a thickness of about 2,000 Å. A thickness of the metal layer ML may be set based on a thickness of an engraved pattern 112a. (S101 of FIG. 10)

Figure 11B:
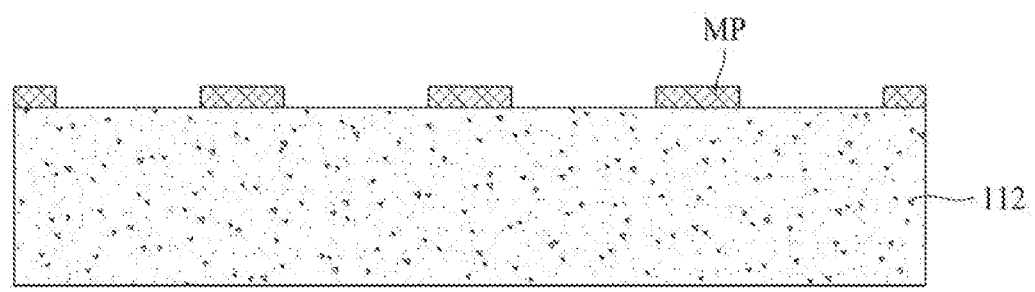

Second, as in FIG. 11B, a mask M may be aligned on the metal layer ML, and by exposing a portion of the metal layer ML with UV, a metal pattern MP may be formed. (S102 of FIG. 10)

Figure 11C:
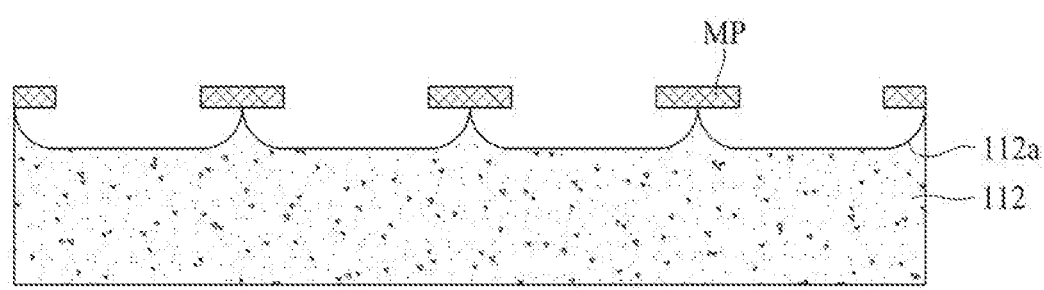

Third, as in FIG. 11C, the second substrate 112 on which the metal pattern MP is formed may be etched by using a gas such as hydrogen fluoride (HF). Therefore, the engraved pattern 112a may be formed on one surface of the second substrate 112 on which the metal pattern MP is not formed. (S103 of FIG. 10)

Figure 11D:
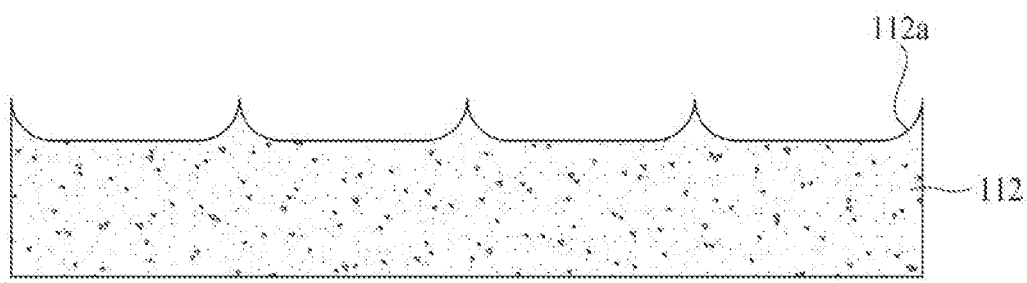

Fourth, as in FIG. 11D, the metal pattern MP remaining on the one surface of the second substrate 112 may be removed. (S104 of FIG. 10)

Figure 11E:
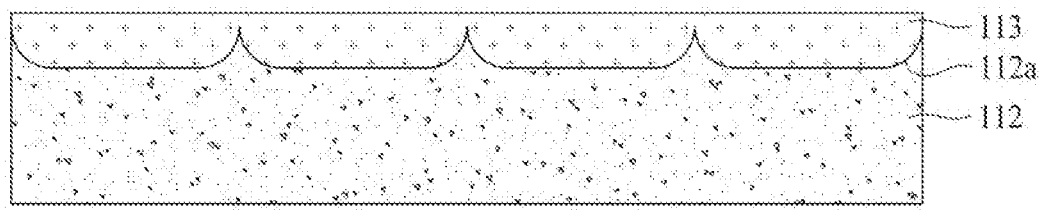

Fifth, as in FIG. 11E, a lens layer 113 may be formed by coating resin on the one surface of the second substrate 112. The resin may be UV-curable resin. Also, the resin may have a refractive index which is higher than that of the second substrate 112. In a case where the second substrate 112 is glass, the second substrate 112 may have a refractive index of 1.5, and thus, the resin may be a material having a refractive index of 1.6 or more. For example, the resin may be a material where an acrylate monomer, a high refractive dispersed inorganic particle, a UV photo initiator, and an additive are mixed. The acrylate monomer may be a urethane acrylate monomer, and the high refractive dispersed inorganic particle may be a zirconia powder ($ZrO_2$). However, the present embodiment is not limited thereto. Therefore, the lens layer 113 may act as a lens having a certain refractive index, based on a shape of the engraved pattern 112a. (S105 of FIG. 10)

In a case where the second substrate 112 is a plastic substrate, the engraved pattern 112a may be formed on the one surface of the second substrate 112 through extrusion molding, press molding, and/or the like.

As described above, according to the embodiments of the present disclosure, a curvature radius of the curvature part may be set based on a refractive index of the second substrate, a refractive index of a lens, and a focal distance of the curvature part. Also, according to the embodiments of the present disclosure, a width of the curvature part may be set based on a width of the black matrix, a thickness of the second substrate, and a focal distance of the curvature part. As a result, according to the embodiments of the present disclosure, light which is emitted from a pixel and travels to the curvature part of the lens through the opening area may be refracted by the curvature radius and may be output in an up direction. That is, according to the embodiments of the present disclosure, the light emitted from the pixel may be expanded and output to an area where the black matrix is provided. Accordingly, according to the embodiments of the present disclosure, the black matrix is not discerned by a user.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display module comprising:
 a first substrate provided with a plurality of pixels having an organic light emitting device emitting light;
 a second substrate including one surface on which an engraved pattern is provided, the engraved pattern including a plurality of pointed protrusions each having a tapered point projecting away from the plurality of pixels;
 a lens layer filled into the engraved pattern of the second substrate;
 a black matrix between the first substrate and the second substrate; and
 an opening area uncovered by the black matrix,
 wherein the lens layer includes a plurality of lenses corresponding to each of the plurality of pixels and projecting toward the plurality of pixels and the engraved pattern of the second substrate,
 wherein each of the plurality of lenses includes a unitary planar part overlapping with a center of the corresponding pixel, and a curvature part formed in a curved shape extended from an end of the unitary planar part to overlap an area between the plurality of pixels,
 wherein an entire width of the unitary planar part is greater than a width of the entire curvature part, wherein an entirety of the unitary planar part overlaps with a majority or more of a corresponding pixel among the plurality of pixels, wherein the unitary planar part overlaps with portions of the black matrix disposed on opposite sides of the corresponding pixel in a vertical direction relative to the first substrate, wherein each of the plurality of pointed protrusion extends into the lens layer in an area between adjacent lenses among the plurality of lenses, and each of the portions of the black matrix is disposed between one of the plurality of pointed protrusions and the first substrate, wherein the portions of the black matrix overlap the unitary planar part in the thickness direction of the first substrate, wherein the opening area is disposed between the organic light emitting device and the lens layer, wherein the lens layer is in direct contact with the one surface of the second substrate, and wherein the black matrix is in direct contact with the other surface of the second substrate that is opposite to the one surface of the second substrate.

2. The display module of claim 1, wherein a refractive index of the lens layer is greater than a refractive index of the second substrate.

3. The display module of claim 1, wherein a pitch of each of the plurality of lenses is the same as a sum of a width of the black matrix and a width of the opening area.

4. The display module of claim 3, wherein the curvature part overlaps with both the black matrix and a bank disposed between two adjacent pixels among the plurality of pixels.

5. The display module of claim 1, wherein the unitary planar part is disposed in the opening area, and the curvature part is overlapped with the black matrix.

6. The display module of claim 1, wherein when a curvature radius of the curvature part is R, a focal distance of the curvature part is f, a refractive index of the second substrate is n1, and a refractive index of the lens layer is n2, $$R = \frac{n2 - n1}{n1} \times f$$

is satisfied.

7. The display module of claim 1, wherein when the width of the curvature part is a focal distance of the curvature part is f, a width of the black matrix is B, and a thickness of the second substrate is T, $$a' = \frac{B \times f}{2T}$$

is satisfied.

8. The display module of claim 1, wherein the unitary planar part overlaps at least a substantial portion of the corresponding pixel.

9. The display module of claim 1, wherein each of the plurality of lenses has a convex shape, and edges of the convex shape curve away from the corresponding pixel.

10. A head-mounted display device comprising:
an eyepiece lens; and
a display module providing an image to the eyepiece lens, wherein the display module comprises:
  a first substrate provided with a plurality of pixels having an organic light emitting device emitting light;
  a second substrate including one surface on which an engraved pattern is provided, the engraved pattern including a plurality of pointed protrusions each having a tapered point projecting away from the plurality of pixels;
  a lens layer filled into the engraved pattern of the second substrate;
  a black matrix between the first substrate and the second substrate; and
  an opening area uncovered by the black matrix,
wherein the lens layer includes a plurality of lenses corresponding to each of the plurality of pixels and projecting toward the plurality of pixels and the engraved pattern of the second substrate, wherein each of the plurality of lenses includes a unitary planar part, overlapping with a center of the corresponding pixel, and a curvature part formed in a curved shape extended from an end of the unitary planar part to overlap an area between the plurality of pixels, wherein an entire width of the unitary planar part is greater than a width of the entire curvature part, wherein an entirety of the unitary planar part overlaps with a majority or more of a corresponding pixel among the plurality of pixels, wherein the unitary planar part overlaps with portions of the black matrix disposed on opposite sides of the corresponding pixel in a vertical direction relative to the first substrate, wherein each of the plurality of pointed protrusion extends into the lens layer in an area between adjacent lenses among the plurality of lenses, and each of the portions of the black matrix is disposed between one of the plurality of pointed protrusions and the first substrate, wherein the portions of the black matrix overlap the unitary planar part in the thickness direction of the first substrate, wherein the opening area is disposed between the organic light emitting device and the lens layer, wherein the lens layer is in direct contact with the one surface of the second substrate, and wherein the black matrix is in direct contact with the other surface of the second substrate that is opposite to the one surface of the second substrate.

11. The head-mounted display device of claim 10, wherein a refractive index of the lens layer is greater than a refractive index of the second substrate.

12. The head-mounted display device of claim 10, wherein a pitch of each of the plurality of lenses is the same as a sum of a width of the black matrix and a width of the opening area.

13. The head-mounted display device of claim 10, wherein the unitary planar part is disposed in the opening area, and the curvature part is overlapped with the black matrix.

14. The head-mounted display device of claim 10, wherein when a curvature radius of the curvature part is R, a focal distance of the curvature part is f, a refractive index of the second substrate is n1, and a refractive index of the lens layer is n2, $$R = \frac{n2 - n1}{n1} \times f$$

is satisfied.

15. The head-mounted display device of claim 10, wherein when the width of the curvature part is a', a focal distance of the curvature part is f, a width of the black matrix is B, and a thickness of the second substrate is T, $$a' = \frac{B \times f}{2T}$$

is satisfied.

* * * * *